April 24, 1956 J. R. RIEDE 2,742,703
DEPTH AND DISTANCE MEASURING GAUGE
Filed June 12, 1953 2 Sheets-Sheet 1
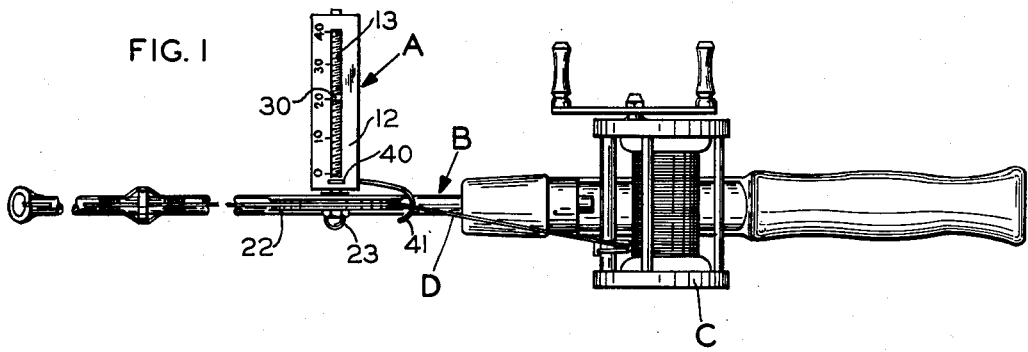
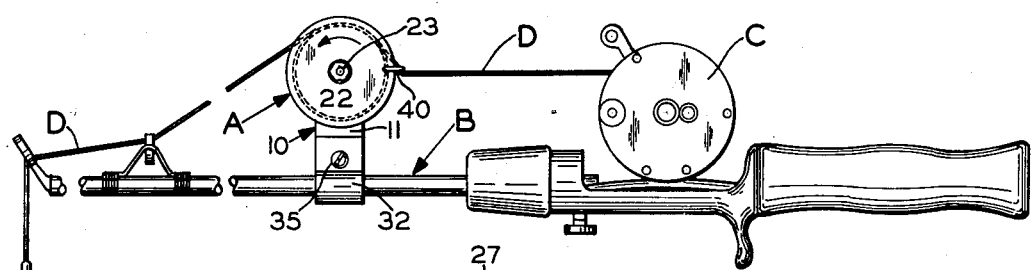
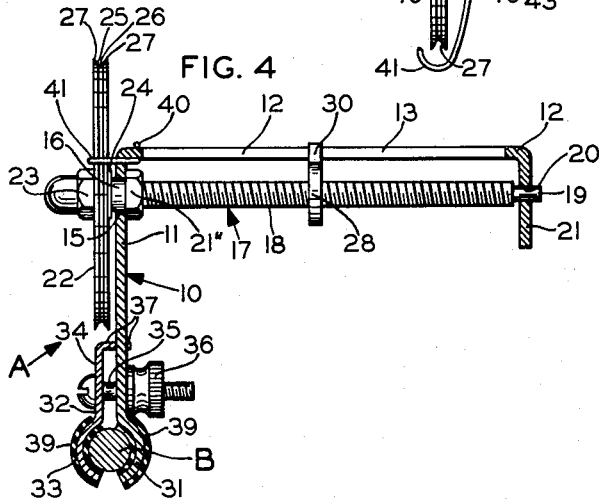
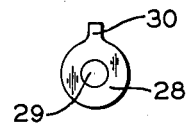
INVENTOR
JOHN R. RIEDE
BY
ATTORNEY April 24, 1956 J. R. RIEDE 2,742,703
DEPTH AND DISTANCE MEASURING GAUGE
Filed June 12, 1953 2 Sheets-Sheet 2

INVENTOR
JOHN R. RIEDE
BY
ATTORNEY

United States Patent Office 2,742,703
Patented Apr. 24, 1956

2,742,703

DEPTH AND DISTANCE MEASURING GAUGE

John R. Riede, St. Paul, Minn.

Application June 12, 1953, Serial No. 361,150

5 Claims. (Cl. 33—129)

My invention relates to an improvement in a device for measuring depth and distance and more particularly to a device whereby the pay out of a weighted line or a line drawn from a supply wheel actuates the device which gives a reading of the length of line payed out.

It is a feature of my invention to provide a device for measuring distance which may be easily mounted, for example, on a fishing rod just forward of the reel, the line passing from the reel being placed around a wheel which is rotated by the payed out line. It is a further feature to provide a distance measuring device having a wheel rotated by a line payed out from a supply wheel which in turn moves a pointer across a scale by means of a threaded shaft secured to the wheel.

It is also a feature to provide a gauge which can be used to simply and positively measure vertical or horizontal distances such as the depth of water, the depth of line for fishing and distance over the ground by the mere pay out of line in connection with my device.

It is a further feature to provide a numbered scale member used in connection with a pointer actuated by a wheel which drives the pointer across the scale to the extreme limit. The payed out line which drives the wheel may be placed around the wheel for reverse rotation of the wheel and further line payed out, thus moving the pointer back toward the starting point whereby the original payed out amount may be added to the additional payed out amount of line thus giving the device almost unlimited capacity.

It is an additional feature to provide a distance or depth gauge which is actuated by the line passing through the same, the line being actually measured for direct reading. It is also a feature to provide a distance measuring device which may be easily slipped onto a fishing rod into operating position with the line already on the reel and rod.

The invention will appear more clearly from the following detailed description when taken in connection with the accompanying drawings, showing by way of examples preferred embodiments of the inventive idea wherein like numerals are employed to designate like parts throughout.

In the drawings forming part of the application:

Figure 1 is a top plan view of my device in operative position on a fishing rod.

Figure 2 is a longitudinal side view of that shown in Figure 1.

Figure 3 is a plan view of my distance measuring gauge.

Figure 4 is a side view thereof partially in section and mounted on a rod also shown in section.

Figure 5 is a side view of the marker of my device.

Figure 6:
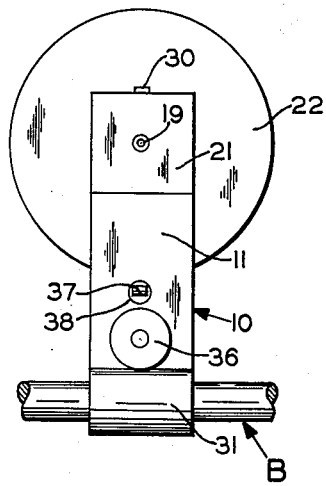
Figure 6 is an end view of my device showing a portion of the rod on which the same is mounted.
Figure 7:
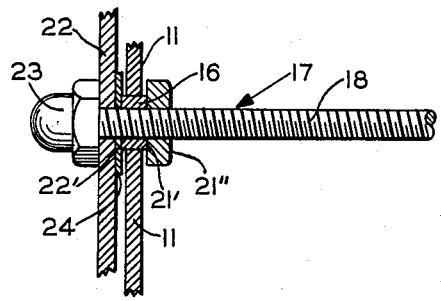
Figure 7 is a partial detailed sectional view of a portion of the driven threaded shaft and wheel and the support therefor.

Referring to the drawings in detail, my distance measuring device A is shown mounted on the fishing rod B and is composed of the bracket member 10 which consists of the upright portion 11 together with the top plate member 12 formed thereon at substantially right angles thereto. The top member 12 has formed therein the elongated slot 13 with the gauge division markings such as 14. The upright portion 11 has formed therethrough the hole 15 which provides a bearing surface for the enlarged portion 16 formed on the shaft 17. The shaft 17 is threaded substantially the entire length thereof as at 18.

I further provide the cylindrical extension portion 19 on the shaft 17 which rotates freely within the bearing hole 20 formed in the depending flange 21 which extends from the outer end of the top member 12. Thus the shaft 17 rotates on the bearing 15 and the bearing 20. The shaft 17 is rotatably secured in the bearing hole 15 by means of the nut 21" which is drawn up tightly against the shoulder 21' formed by the enlarged portion 16 and the further construction hereinafter defined. I also provide a wheel 22 which is mounted on the shaft 17 against the shoulder 22' formed by the other end of the enlarged portion 16. The wheel 22 is fixed on the shaft 17 against the shoulder 22' by means of the threaded cap nut 23 with the washer 24 interposed between the upright member 11 and the wheel 22. The wheel 22 has formed on the outer periphery thereof the groove 25 adapted to receive a line from a supply reel such as C. The groove 25 has the flat bottom 26 and the rounded edges 27 for easier handling and less wear on the line.

I further provide the marker 28 which has the hole 29 formed therethrough with threads equivalent to those of the shaft 17. The marker 28 has the pointer portion 30 formed thereon which extends into and engages the slot 13, and as the wheel 22 is rotated the marker 28 bears against the side edge of the slot 13 and is thereby forced to travel on the threaded shaft 17 across the gauge markings 14 in either direction depending upon the direction of rotation of the wheel 22.

The lower end of the upright portion 11 is formed with the curved end 31 adapted to fit around a portion of the rod B or any other suitable support device in conjunction with the half clamp member 32 having the curved end 33 and the straight portion 34 through which is positioned the bolt 35 on which is mounted the nut 36 for tightening the clamp ends 31 and 33 upon the rod B. Extending from the upper end of the clamp member 32 is the right angular positioning lug member 37 which engages in the hole 38 formed in the upright portion 11 of the bracket 10 to prevent the half clamp member 32 from turning. I also provide the protector gripping members 39 which are short pieces of rubber or plastic flexible tubing or the like forced upon the ends 31 and 33.

So that the line D is kept on the wheel 22 I provide the guide member 40 formed with the hook end portion 41. The end 40' of the guide 40 is secured through the two holes 42 and 43 formed in the top plate 12. It is, however, apparent that any suitable type of guide means for the line D may be used.

Figure 8:
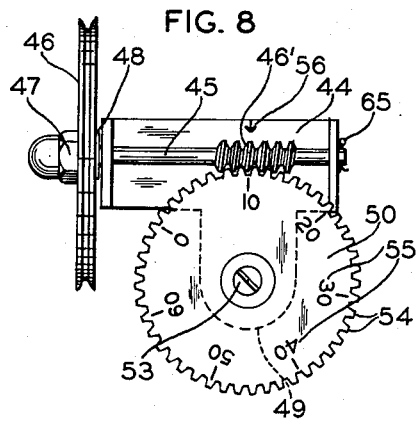
Figure 8 is a plan view of a further form of construction of my device.
Figure 10:
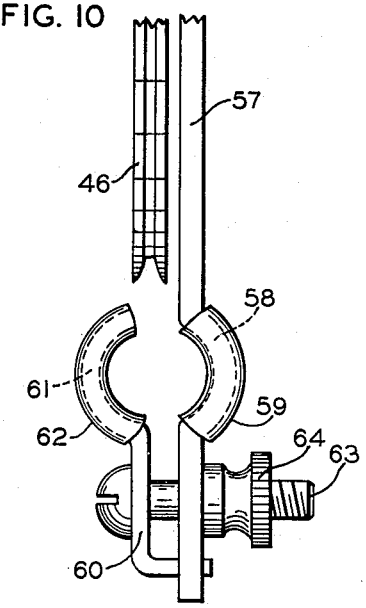
Figure 10 is a further form of a member for clamping my device to a rod member.
Figure 9:
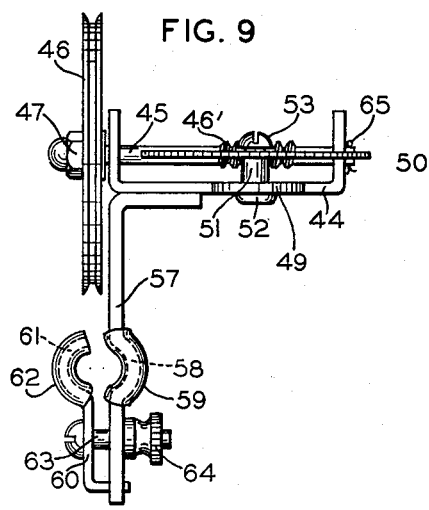
Figure 9 is a side view of the construction shown in Figure 8.

I also provide a further form or embodiment of my invention in Figures 8–10 of the drawings which includes the U-shaped bracket 44. Mounted on the bracket 44 is the shaft 45 having the worm gear portion 46'. The shaft 45 is rotated by means of the wheel 46 which is similar to the wheel 22 operated by the line D. The nut 47 secures the wheel 46 to the shaft 45 with the washer 48 interposed between the wheel 46 and the bracket 44 for free rotation of the wheel.

The bracket 44 has formed thereon the extension portion 49 on which is rotatably mounted the toothed wheel 50. The cylindrical member 51 is positioned on the support bolt 52 which extends through the extension 49. The member 51 forms a shoulder for the wheel 50 and the wheel is retained on the member 51 by means of the bolt 53 which is screwed into the member 51. The teeth 54 of the wheel 50 are engaged by the worm gear 46' and as the shaft 45 is rotated the wheel 50 is thereby rotated to advance the markings 55 from the pointer 56.

The bracket member 44 is secured to the alternative form of upright support such as 57 which is formed with the arcuate portion 58 on which is slipped the portion of rubber tubing 59. The half clamp member 60 is formed with curved end portion 61 on which is slipped the piece of rubber tubing 62. The member 60 is held on the support 57 by means of the bolt 63 which is tightened by means of the nut 64.

The shaft 45 is held in position on the bracket 44 by means of the cotter pin 65.

In using my device the bracket 10 is clamped on the fishing rod B in approximately the position shown in Figures 1 and 2, and the line D is wound once around the wheel 22 as indicated in broken lines in Figure 2. In this position the wheel 22 is rotated in the direction of the arrow when the line D is payed out through the eyelet formed on the end of the rod B. As the line D rotates the wheel 22 the threaded shaft 17 is thereby rotated, and as a result the marker or pointer 28 is caused to bear against the side of the slot 13 and move across the gauge markings 14. The marker or pointer 28 will move a given distance along the gauge markings such as 14 for each turn of the wheel. If the wheel 22 is of such a diameter that the line D wrapped one turn in the groove 26 is six inches long, the wheel 22 will turn once for every six inches of line passing around it. Further, if the threaded shaft 17 is 32 threads to the inch and the marker or pointer member 28 is tapped with the same thread, each revolution of the wheel 22 will move the marker 28 $\frac{1}{32}$" along the threaded shaft 17. Using these figures, the marker 28 will move $\frac{1}{16}$" for each foot of line which passes around the wheel groove 26. It is apparent that any number of grooved diameters and threads per inch may be used to give various gauge readings on the slot 13.

A slight tension must be maintained on the line D being payed off of the reel C to prevent line slippage on the grooved wheel 22. This is accomplished by exerting a slight pressure on the reel spool C with the thumb or giving a slight mechanical drag in the reel. As the line D is rewound onto the fishing reel C the weight which was used to pull or pay out the line D is sufficient to maintain the tension necessary to prevent line slippage on the wheel 22.

If it is desired to use a given depth and distance measuring gauge such as that disclosed to measure a distance greater than that shown on the scale, it may be used as follows: when the marker member 28 has reached the point of highest reading on the far end of the slot 13, the line D is removed from the wheel 22 and the direction of wrap of the line about the wheel is reversed and any further line payed out over the wheel will turn the threaded shaft 17 in the opposite direction and thereby move the marker 28 back toward the zero gauge number. By adding the highest reading to the amount of reading which the marker 28 moves back, the total distance is obtained. It is also apparent that a second scale or gauge may be inscribed on the opposite side of the slot 13 whereby the total direct readable range of the gauge markings such as 14 would be doubled. Distances may also be measured in excess of that indicated on the scale illustrated by removing the line D from the wheel 22 after the marker 28 has reached its extended limit and spin the wheel back manually to zero. The line is then replaced on the wheel 22 and more line is payed out. By adding the additional distance to that already obtained, the total distance is measured.

The principles for operation of the further form of the invention illustrated in Figures 8, 9 and 10 are essentially those as described above with regard to the embodiment shown in Figures 1 through 7. It is therefore apparent that I have presented a device for measuring distances which is simple in construction, easy to use and requires little maintenance. My device is line propelled and thus actually measures the line that passes over the wheel 22. Nothing of an auxiliary nature is needed.

The invention is not to be understood as restricted to the details set forth, since these may be modified within the scope of the appended claims without departing from the spirit and scope of the invention.

Having thus described the invention, what I claim as new and desire to secure by Letters Patent is:

1. In a flat device for measuring distances, a flat bracket member having a top portion and depending end members, a threaded shaft rotatably mounted on said depending end members of said bracket, a line receiving wheel secured to said shaft and outwardly of one of said end members, a slotted opening formed in said top portion of said bracket, a flat threaded pointer member mounted on said threaded shaft and extending into said slotted opening adapted to travel across said slotted opening when said wheel is rotated by means of a line mounted around said wheel, a springable line guide attached to said bracket having an open arcuate end partially enclosing a rim segment of said wheel, and clamp means formed on the lower end of one of said end members of said bracket for mounting the same adjacent a reel having a supply of line.

2. In a distance measuring device, a bracket formed with depending end members, a threaded shaft rotatably mounted on said depending members of said bracket, said bracket formed with a top member having a slot formed therein, a calibrated scale formed on said top member of said bracket adjacent said slot; a flat threaded marker member mounted on said shaft and formed with a pointer portion adapted to extend into said slot, a wheel connected to said shaft adapted to receive a line around the same for rotating said shaft to thereby cause said pointer to travel in said slot, clamp means formed on the lower end of one of said depending end members of said bracket for removably mounting the same upon a fishing rod, and an elongated line guide attached on one end to said bracket member and having an opposite open arcuate end partially encircling a segment of the periphery of said wheel.

3. In combination with a reel adapted to hold a supply of line, a right angular removable bracket member including a normally vertical portion and a horizontal outer portion, a rotatable shaft supported by said vertical portion of said bracket, a thread formed on said shaft, an indicator adapted to ride on said thread, a scale on said horizontal portion of said bracket having indicia to indicate the position of said indicator, a depending flange formed on the outer end of said horizontal portion, the outer end of said shaft rotatably mounted on said depending flange, a wheel mounted on said shaft adapted to rotate the same to move said indicator when the line from said reel is threaded around said wheel thereby indicating the extent of the line paid out from said reel, and clamp means formed on one end of said bracket for attaching the same adjacent a reel having a supply of line.

4. In a line measuring device, a support having a flat top portion and a depending bracket portion formed on the inner end of said top portion, a depending bearing portion formed on the outer end of said support, an elongated threaded member rotatably mounted on said depending bracket portion and extending outwardly thereof, a grooved wheel connected to said threaded member at the outward extension thereof, said depending bearing portion of said support having a hole formed therethrough, one end of said threaded member having a portion thereof adapted to rotate in said hole of said bearing portion, a flat threaded marker mounted on said threaded member, said flat top portion of said support having a slot formed therein, a pointer formed on said marker adapted to extend into said slot, and clamp means formed on the lower end of said depending bracket portion.

5. A gauge for measuring fishing line comprising a flat top member having an elongated slot formed therein, a calibrated scale formed on said top member adjacent said slot, an elongated depending bracket member formed on the inner end of said top member having a bearing hole formed therein near the top thereof and an arcuate end portion adapted to be positioned partially about a fishing rod, a short depending member formed on the outer end of said top member having a bearing hole formed therein, a half-clamp member cooperable with said elongated depending bracket member having an arcuate end portion, an upstanding wall formed on the opposite end of said half-clamp member having a positioning lug formed thereon engageable in an opening in said elongated depending bracket member, a threaded shaft rotatably supported in said bearing holes in said depending members and extending through said elongated depending bracket, a flat threaded pointer member mounted on said threaded shaft having an elongated lug extending into the slot in said top member and adapted to travel across said slotted opening, a line-driven pulley wheel having a concave periphery fixedly attached to the inner end of said threaded shaft and rotatable therewith, means for removably attaching said half-clamp to said depending bracket member, and an elongated springable line guide affixed to said top member having an arcuate open opposite end partially enclosing a rim segment of said pulley wheel.

References Cited in the file of this patent

UNITED STATES PATENTS

| | | |
|---|---|---|
| 209,164 | Farnsworth | Oct. 22, 1878 |
| 448,368 | Reading | Mar. 17, 1891 |
| 2,233,530 | Holman | Mar. 4, 1941 |
| 2,500,026 | Erickson | Mar. 7, 1950 |
| 2,576,629 | Morby | Nov. 27, 1951 |
| 2,637,112 | La Fontaine et al. | May 5, 1953 |
| 2,682,129 | Hamilton | June 29, 1954 |

FOREIGN PATENTS

| | | |
|---|---|---|
| 573,747 | Germany | Apr. 5, 1933 |